United States Patent [19]
Lord et al.

[11] Patent Number: 5,983,371
[45] Date of Patent: Nov. 9, 1999

[54] ACTIVE FAILURE DETECTION

[75] Inventors: Christopher C. Lord, Princeton; David B. Schwartz, Framingham, both of Mass.

[73] Assignee: Marathon Technologies Corporation, Boxboro, Mass.

[21] Appl. No.: 08/891,539

[22] Filed: Jul. 11, 1997

[51] Int. Cl.⁶ .................................................. G06F 11/00
[52] U.S. Cl. ............................................................ 714/55
[58] Field of Search ..................... 395/185.08, 185.09, 395/183.19, 182.1, 182.07, 182.08, 182.09, 845, 846, 878, 559, 553; 364/131, 143; 371/5.4, 42, 47.1

[56] References Cited

U.S. PATENT DOCUMENTS

| | | | |
|---|---|---|---|
| Re. 31,407 | 10/1983 | Furtman et al. ........................ | 364/200 |
| 3,818,458 | 6/1974 | Deese .................................... | 340/172.5 |
| 4,360,912 | 11/1982 | Metz et al. ............................... | 370/96 |
| 4,451,916 | 5/1984 | Casper et al. ............................ | 370/16 |
| 4,477,873 | 10/1984 | McCarley ............................... | 364/200 |
| 4,491,968 | 1/1985 | Shimp et al. ............................ | 455/67 |
| 4,589,066 | 5/1986 | Lam et al. .............................. | 364/200 |
| 4,610,013 | 9/1986 | Long et al. . | |
| 4,611,289 | 9/1986 | Coppola ................................. | 364/492 |
| 4,710,926 | 12/1987 | Brown et al. . | |
| 4,780,844 | 10/1988 | Keller ..................................... | 364/900 |
| 4,809,163 | 2/1989 | Hirosawa et al. ....................... | 364/200 |
| 4,847,837 | 7/1989 | Morales et al. .......................... | 371/8 |
| 4,951,171 | 8/1990 | Tran et al. ............................... | 361/90 |
| 4,967,344 | 10/1990 | Scavezze et al. ....................... | 364/200 |
| 5,068,780 | 11/1991 | Bruckert et al. ........................ | 395/700 |
| 5,086,499 | 2/1992 | Mutone .................................. | 364/200 |
| 5,109,486 | 4/1992 | Seymour ................................ | 395/200 |
| 5,157,663 | 10/1992 | Major et al. ............................ | 371/9.1 |
| 5,193,179 | 3/1993 | Laprade et al. ......................... | 395/575 |
| 5,214,782 | 5/1993 | McCurdy, Jr. .......................... | 395/750 |
| 5,226,120 | 7/1993 | Brown et al. ........................... | 395/200 |
| 5,255,367 | 10/1993 | Bruckert et al. ........................ | 395/200 |
| 5,353,436 | 10/1994 | Horst ...................................... | 395/550 |
| 5,363,503 | 11/1994 | Gleeson ................................. | 395/575 |
| 5,367,670 | 11/1994 | Ward et al. ............................. | 395/575 |
| 5,390,326 | 2/1995 | Shah . | |
| 5,404,542 | 4/1995 | Cheung .................................. | 395/750 |
| 5,423,037 | 6/1995 | Hvasshovd ............................. | 395/600 |
| 5,432,715 | 7/1995 | Shigematsu et al. ............. | 364/551.01 |
| 5,438,675 | 8/1995 | Fujioka .............................. | 395/182.07 |
| 5,442,472 | 8/1995 | Skrobko ................................. | 359/110 |
| 5,448,723 | 9/1995 | Rowett .............................. | 395/200.02 |
| 5,488,304 | 1/1996 | Hamade et al. ........................ | 324/520 |
| 5,493,650 | 2/1996 | Reinke et al. ..................... | 395/200.12 |
| 5,522,030 | 5/1996 | Matsubara ......................... | 395/182.02 |
| 5,542,047 | 7/1996 | Armstrong ........................ | 395/200.11 |
| 5,600,784 | 2/1997 | Bissett et al. ........................ | 395/182.1 |

FOREIGN PATENT DOCUMENTS

| | | |
|---|---|---|
| 0 649 092 | 4/1995 | European Pat. Off. . |
| 0 760 503 | 3/1997 | European Pat. Off. . |

Primary Examiner—Robert W. Beausoliel, Jr.
Assistant Examiner—Pierre E. Elisca
Attorney, Agent, or Firm—Fish & Richardson P.C.

[57] ABSTRACT

Failures in a fault-tolerant computer system which includes two or more input/output processors connected to a data communication system are detected by monitoring data communication. The computer system is able to detect failures associated with a primary input/output processor, as well as with a standby input/output processors, and is also able to discriminate between failures of the input/output processors and communication failures in the data communication network itself. In addition to using heartbeat-like transmissions, various other categories of data communication are also used to detect failures. The system is able to detect failures when the input/output processors are on a common network segment, allowing the processors to monitor identical data traffic, as well as when the processors are on different segments where, as a result of filtering behavior of network elements such as active hubs, the processors may not be able to monitor identical data traffic.

24 Claims, 5 Drawing Sheets

ACTIVE FAILURE DETECTION

BACKGROUND

This invention relates to the detection of failures, such as communication failures, in a fault-tolerant computing system.

Redundant hardware elements are commonly used in fault-tolerant computing systems. Individual elements of the system typically attempt to detect faults by monitoring signals generated by other elements in the system or generated externally to the system.

In addition, an element of the system may periodically transmit a so-called "heartbeat" signal that indicates proper operation of the element. If the heartbeat signal is not received by another element in the system, the receiving element can suspect that the transmitting element is not operational. However, failure to receive a heartbeat signal also may result from a fault in the communication path between the two elements. In general, fault handling should distinguish between a fault in an element of the system and a fault in the communication path between elements.

Redundant network interface controllers (NICs) are used in fault-tolerant computing systems to provide reliable, uninterrupted communication with an external network. In general, one NIC operates in a primary, or active, mode in which the NIC is responsible for communication with other devices on the network, while the other NIC operates in a standby mode.

In operation, the NICs can exchange heartbeat messages to detect failures in a path from one NIC through the external network and back to another NIC. A failure in the path between NICs can occur at several points, including the input or output stages of the NICs, the transmitting or receiving connections between the NICs and the external network, or in the external network itself. The point of connection to the external network is generally at a port of a network hub, with the hub being connected to multiple network devices. Each NIC may be connected to a different hub in the external network to avoid having a single hub become a critical point of failure.

SUMMARY

The invention provides detection of failures in a fault-tolerant computer system that includes two input/output processors connected to a data communication system. The computer system is able to detect failures associated with a primary input/output processor, as well as with a standby input/output processors. The system also is able to discriminate between failures of the input/output processors and communication failures in the data communication network itself. The system analyzes categories of data communication other than "heartbeat-like" transmissions to detect failures. The system is able to detect failures when the input/output processors are on a common network segment that allows the processors to monitor identical data traffic. The system also is able to detect failures when the processors are on different segments where, as a result of filtering behavior of network elements such as switches or active hubs, the processors may be unable to monitor identical data traffic.

A timing criterion may be applied to a category of data communications processed by each input/output processor and a relationship between results obtained for each processor may be used to detect a failure. For example, a failure may be indicated when a difference between the timing of data communication exceeds a threshold. The timing criterion can be the time of last transmission or reception of a category of communication. A category of data communication can be, for example, messages originating outside the fault-tolerant system, such as from another computer system coupled to the data communication system. These messages may be addressed to a group of systems of which the fault-tolerant system is a member. The category also may include messages originating from one of the input/output processors, including messages addressed to the other processor, or messages originating from some other element of the system.

In one aspect, generally, the invention features detecting a failure in a fault-tolerant computer system that includes a first input/output processor and a second input/output processor coupled to a data communication system. A timing criterion is applied to a category of data communications processed by the first and second input/output processors to produce first and second timing results. A relationship between the timing results is determined, and whether a failure has occurred is detected based on the determined relationship.

Embodiments of the invention may include one or more of the following features. For example, detecting whether the failure has occurred may include determining that a failure has occurred when a difference between the timing results exceeds a threshold value.

The timing criterion may be a time of last transmission or reception. The category of data communications may include messages originating from the first input/output processor, such as messages directed to an address to which the second input/output processor is normally responsive or messages sent from the first input/output processor and directed through the data communication system to the second input/output processor. The category of data communications also may include messages originating outside the computer system, such as messages originating at a second computer coupled to the data communication system, or messages addressed to a group of systems of which the computer system is a member. The category of data communications also may include messages originating from a third element of the computer system in data communication with the input/output processors.

The timing criterion may be applied to the category of data communications processed by the first input/output processor at the first input/output processor, and the first timing result may be sent from the first input/output processor to the second input/output processor. The timing criterion may be applied to the category of data communications processed by the second input/output processor at the second input/output processor, and the relationship between the timing results may be determined at the second input/output processor. The first timing result may be sent over a dedicated communication channel between the input/output processors.

A plurality of timing criteria may be applied to a corresponding plurality of categories of data communications processed by the input/output processors to produce first and second pluralities of timing results. Relationships between corresponding ones of the first plurality of timing results and the second plurality of timing results may be determined.

An advantage offered by the invention is that failures in the communication path from the fault-tolerant system to the data network can be identified and in particular, a failure in the data paths coupling the input/output processors can be detected as distinct from a failure in a processor.

Other features and advantages of the invention will be apparent from the following description, including the drawings, and from the claims.

DESCRIPTION

Figure 1:
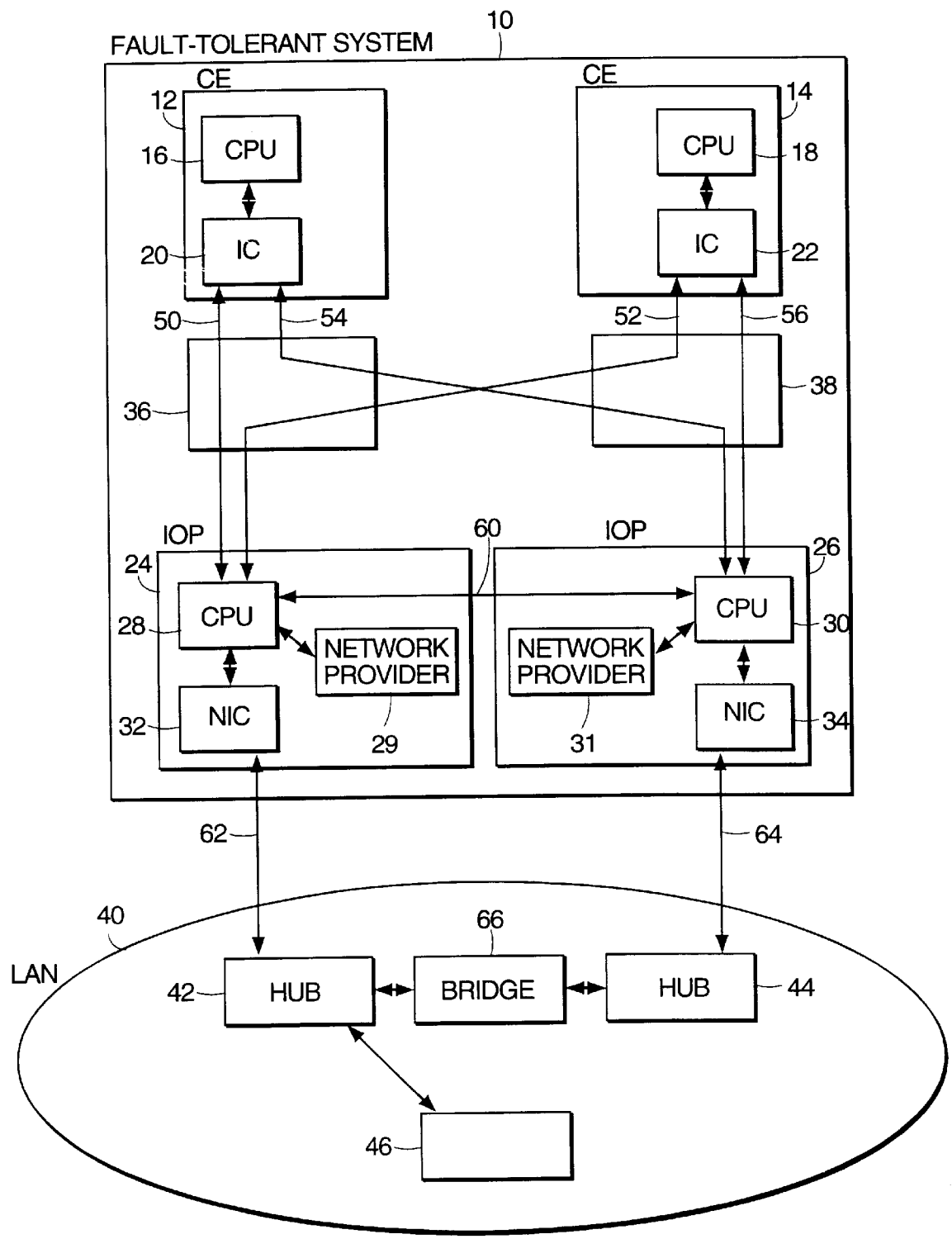
FIG. 1 is a block diagram of a fault-tolerant computing system with redundant computing elements and input/output processors.

Referring to FIG. 1, a fault-tolerant system 10 includes dual-redundant compute elements (CEs) 12 and 14, dual-redundant input/output processors (IOPs) 24 and 26, and communication interconnection devices 36 and 38. CEs 12 and 14 carry out parallel operation sequences. Each CE communicates with both IOPs 24 and 26. CE 12 communicates over communication links 50 and 54, while CE 14 communicates over communication links 52 and 56. The communication links are routed through communication interconnection devices 36 and 38.

Each CE includes a central processing unit (CPU) 16 or 18 and an interface controller (IC) 20 or 22. The ICs provide an interface between the CPUs and the communication links. For example, an I/O request by CPU 16 is transmitted by IC 20 to IOPs 24 and 26 through communication links 50 and 54. With their interconnected communication structure, the IOPs expect to receive identical sequences of commands from each CE in normal operation.

Each IOP includes a CPU 28 or 30 and a network interface controller (NIC) 32 or 34. Network providers 29 and 31 are software drivers that execute on CPUs 28 and 30. NICs 32 and 34 allow the network providers to communicate over a local area network (LAN) 40 through network connections 62 and 64. A dedicated communication path 60 joining CPUs 28 and 30 allows network providers 29 and 31 to exchange messages without using LAN 40.

One network provider operates in a primary state while the other network provider operates in a standby state. Only the network provider operating in the primary state transmits data that originates in CE 12 or 14 to other devices on the LAN.

Network connections 62 and 64 connect to NICs 32 and 34 and terminate at ports of communication hubs 42 and 44 of the LAN 40. Hubs 42 and 44 are connected through a bridge 66 of LAN 40. Hubs 42 and 44 do not filter any communication while bridge 66 filters communication that is not destined to a device accessed through a particular port on the bridge. Hubs 42 and 44 are therefore on different segments of LAN 40. Other devices, such as a device 46, connected to the LAN 40 may communicate with fault-tolerant system 10.

Each of NICs 32 and 34 has a fixed, unique "physical" address and a programmable "logical" address that is configured to be the same for both NICs. The logical address is used for communication between the fault-tolerant system 10 and devices on LAN 40, such as device 46, or devices accessible from LAN 40. Each NIC is also programmed to receive group-addressed messages, such as messages sent to broadcast, multicast, or functional addresses. A group addressed message sent by a NIC specifies the NIC's unique physical address as the source of the message. As such, the recipient of a group addressed message can determine which NIC sent the message.

Network connections 62 and 64 may terminate on a common segment of LAN 40, or on different segments. In general, if connections 62 and 64 terminate on a common segment, then both the NICs may monitor all data traffic on that segment. Accordingly, data transmitted by one NIC may be received by the other NIC even if the data is not addressed to that NIC. By contrast, as shown in FIG. 1, network connections 62 and 64 may terminate on different segments at hubs 42 and 44. These hubs are connected by bridge 66 such that they are on different segments of LAN 40. Bridge 66 is configured to filter the data transmitted to a segment to avoid unnecessary use of communication capacity of that segment. A table of addresses of devices that are on a particular segment connected to bridge 66, or which communicate through that segment, is maintained by the bridge by monitoring data arriving from that segment. A message addressed to a specific device (i.e., a directed message instead of a group addressed message) that is not in the table for a segment is not retransmitted to that segment by bridge 66. On the other hand, group addressed messages are retransmitted on all segments of a LAN without filtering.

In operation, fault-tolerant system 10 determines whether network connections 62 and 64 are connected to a common segment of LAN 40 and therefore whether both NICs should expect to see identical network traffic. If the system determines that the NICs are on different segments, then the system determines that the NICs should expect to see only identical group addressed traffic.

In operation, both the primary network provider and the standby network provider monitor data communications to determine whether a fault has occurred. In the event that a fault would render the network connection of an IOP non-functional, appropriate action is taken. If the active network provider loses network connectivity and the standby network provider is online, a switchover will occur to make the standby network provider the new primary network provider. If the standby network provider loses network connectivity, the standby network provider will enter an offline state until connectivity is reestablished.

The network providers detect faults by monitoring categories of data communication and maintaining the time since the last communication in each category occurred. When a network provider suspects that a communication failure may have occurred, it exchanges a status message with the other network provider over the communication path 60. The status message contains the times of last communication. Each network provider compares the times in a received status message to times maintained by the receiving network provider to identify, failures, if any, in the system. In making the comparisons, the network providers consider a tolerance within which the times should agree. This tolerance accounts for natural variability in transit times and for time needed to assemble and transmit the status messages.

To sense the status of network connections 62 and 64, as well as the status of LAN 40, network providers 29 and 31 periodically transmit through NICs 32 and 34 group addressed messages, known as noise packets, addressed to a group address monitored by both of the NICs. The source address of the group addressed message is set to the unique physical address of the transmitting NIC so that the receiving NICs can determine the source. When the network connections are on a common segment, the message is directly received by the NICs. When the source and receiving NICs are on separate segments, the group addressed packets are retransmitted from one segment to another in normal operation of LAN 40.

When fault-tolerant system 10 is initialized, network providers 29 and 31 go through a sequence of three startup states. In a first state, identified as the joined state, both IOPs have established communication with LAN 40, and have established communication over communication path 60 between processors 28 and 30. Next, in a synchronized state, communication redirection software executing on CPUs 16 and 18 is synchronized with network providers 29 and 31. Finally, in a fully initialized state, input/output requests executed on CPUs 16 and 18 can be sent successfully to network providers 29 and 31 for communication with LAN 40.

Figure 2:
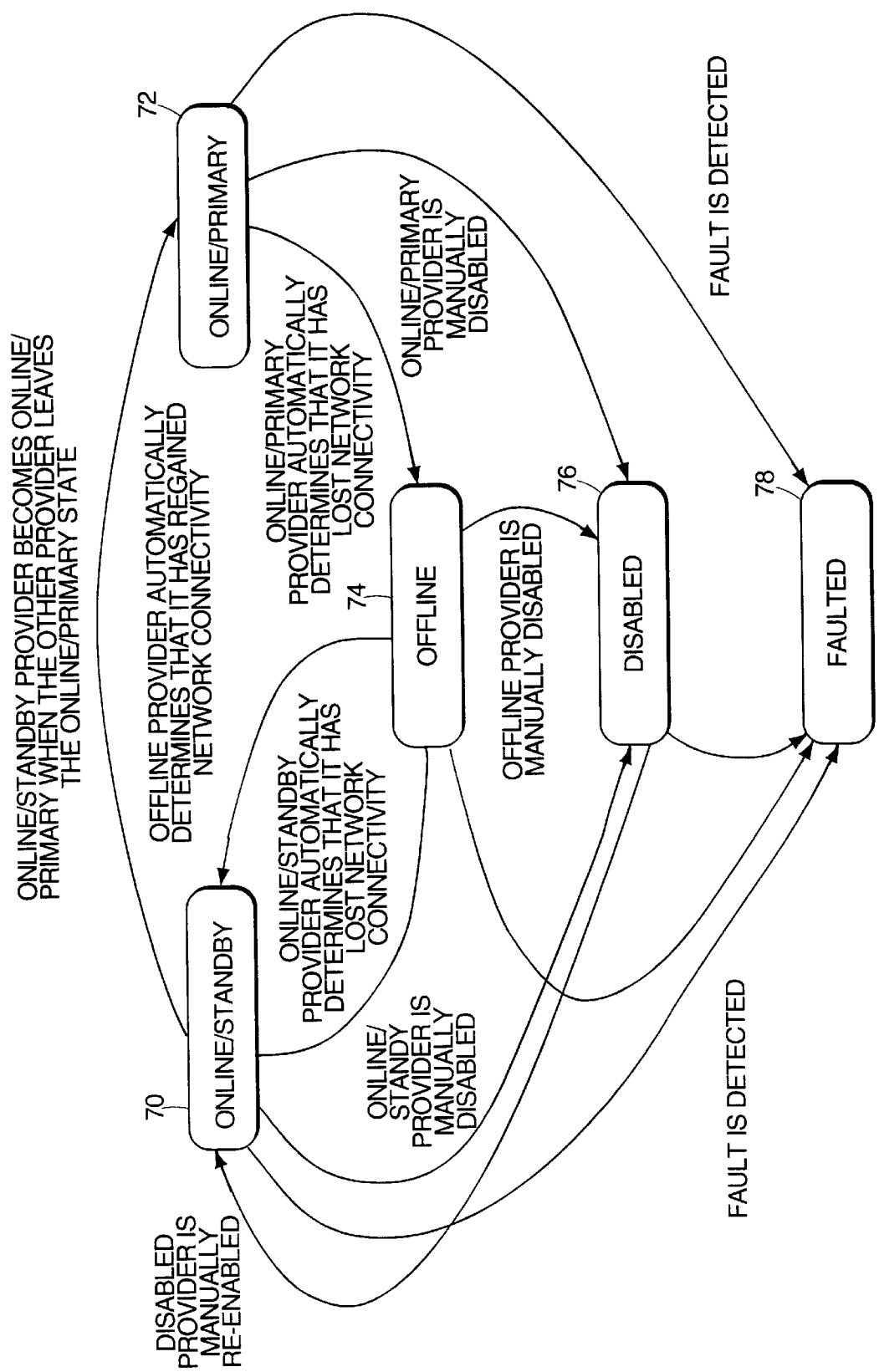
FIG. 2 is a state diagram for an input/output processor.

Referring to FIG. 2, when both network providers are fully initialized, both network providers enter an online/standby state 70. One network provider is subsequently taken from online/standby state to online/primary state 72. Whenever a network provider operating in one of the online states 70, 72 suspects that it may have lost network connectivity, the network provider periodically sends network status requests to the other network provider. If a loss of network connectivity is confirmed, the network provider goes to offline state 74. If the network provider operating in the online/primary state 72 detects the loss of network connectivity and goes to offline state 74, the network provider operating in the online/standby state 70 goes to online/primary state 72. Note that the automatic transition from online/primary state 72 to offline state 74 is only allowed when the other network provider is in online/standby state 70. While in offline state 74, a network provider periodically sends network status requests to the other network provider over link 60. If network connectivity is reestablished, then the network provider returns to online/standby state 70.

In addition to automatic transitions, operator controlled changes of state from online and offline states 70, 72, and 74 to a disabled state 76 may occur. When a network provider in state 76 is manually re-enabled, the network provider enters online/standby state 70 and then transitions immediately to offline state 74 if network connectivity is not confirmed. Finally, other detection mechanisms can determine that a network provider has failed, which results in the network provider entering a faulted state 78.

Figure 3:
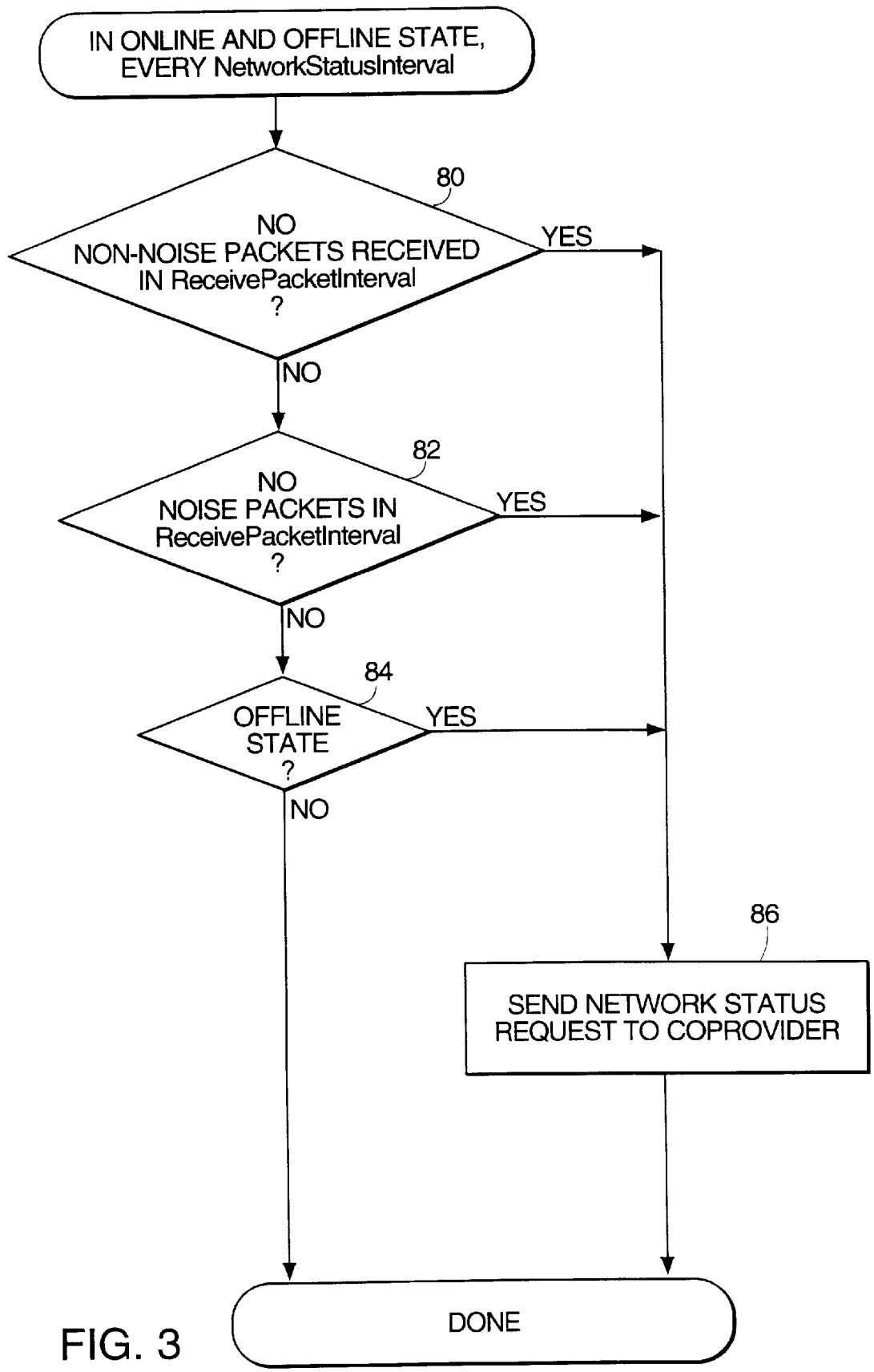
FIGS. 3–5 are flow charts of operations performed by an input/output processor.

Referring to FIG. 3, when a network provider is in online or offline states 70, 72, or 74, the network provider repeatedly checks if a network status request should be sent to the other network provider over communication path 60. In particular the network provider determines whether to send a network status request upon expiration of an interval referred to as the NetworkStatusInterval. The default value for NetworkStatusInterval is 1000 milliseconds. Upon expiration of that interval, the network provider determines if one of three conditions is met. The first condition is true if no non-noise packets have been received in an interval referred to as ReceivePacketInterval (step 80). The default value of ReceivePacketInterval is 4000 milliseconds which corresponds to the typical maximum interval between packets received by system 10. The second condition is true if no noise packets have been received from the other network provider in the previous ReceivePacketInterval (step 82). The third condition is true whenever the network provider is in offline state 74 (step 84). If any of these conditions is met, a network status request is sent to the other network provider (step 86). Requests are transmitted without consideration of whether a response has been received to a previous request.

Upon receipt of a network status request, a network provider typically constructs a response message containing the following communication statistics:

| | |
|---|---|
| TimeLastNoiseReceived: | Time since the last noise packet was received from the other processor |
| TimeLastPacketReceived: | Time since the last non-noise packet addressed to the logical (system) address was received |
| TimeLastMulticastReceived: | Time since the last non-noise group addressed packet was received |
| TimeLastNoiseTransmitted: | The time since the last noise message was sent |
| TimeNetworkMonitored: | The time the network provider has been gathering statistics (i.e., the uptime of the system) |
| CountTransmitFailures: | Current transmit failure count |

To protect against both network providers concurrently detecting failures and leaving no network provider in online/primary state 72, a network provider in an online/primary state 72 responds differently to a network status request than a network provider not in the online/primary state 72 sends a network status request and receives a network status request from the remote network provider prior to receiving a response to its own request, the local network provider uses information in the received request to satisfy its request, rather than waiting for a response. The local network provider does not reply to this received request. When a local network provider not in online/primary state 72 sends a network status request and receives a network status request from the remote network provider prior to receiving a response to its own request, the local network provider responds to the request and does not use the information in the received request to satisfy its pending request.

Figure 4:
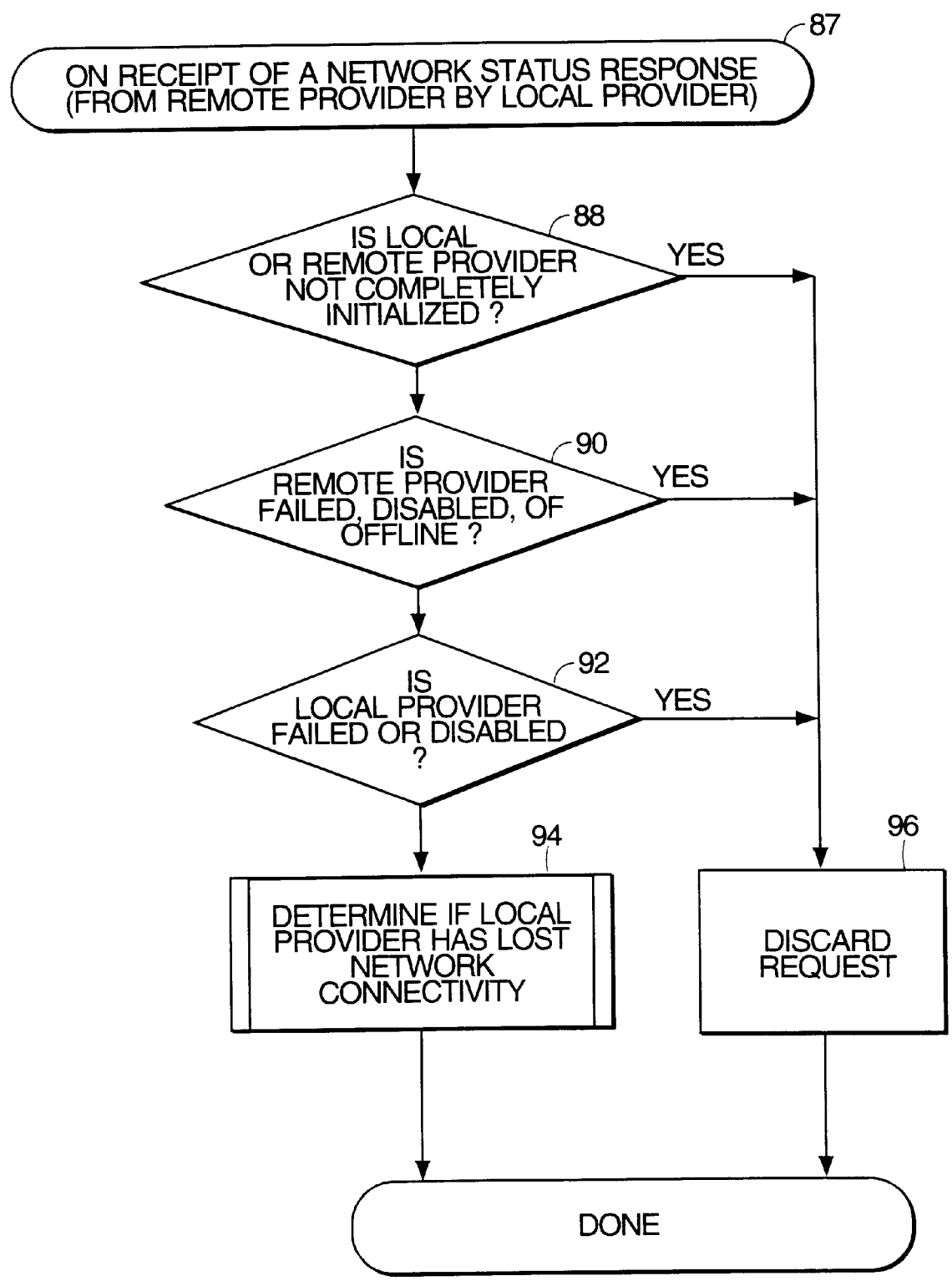

Referring to FIG. 4, upon receipt of a network status response (step 87), a local network provider determines whether the local or the remote network provider is not yet in the fully initialized state (step 88), if the remote network provider is in the faulted state 78 or the disabled state 76 (step 90), or if the local network provider is in the faulted state 78 or the disabled state 76 (i.e., not in online or offline states 70, 72 or 74) (step 92). If none of these conditions is true, the local network provider executes a procedure 94 to determine if the IOP has lost network connectivity. If any condition is true, the response is discarded (step 96) and no processing of the response is performed.

Figure 5:
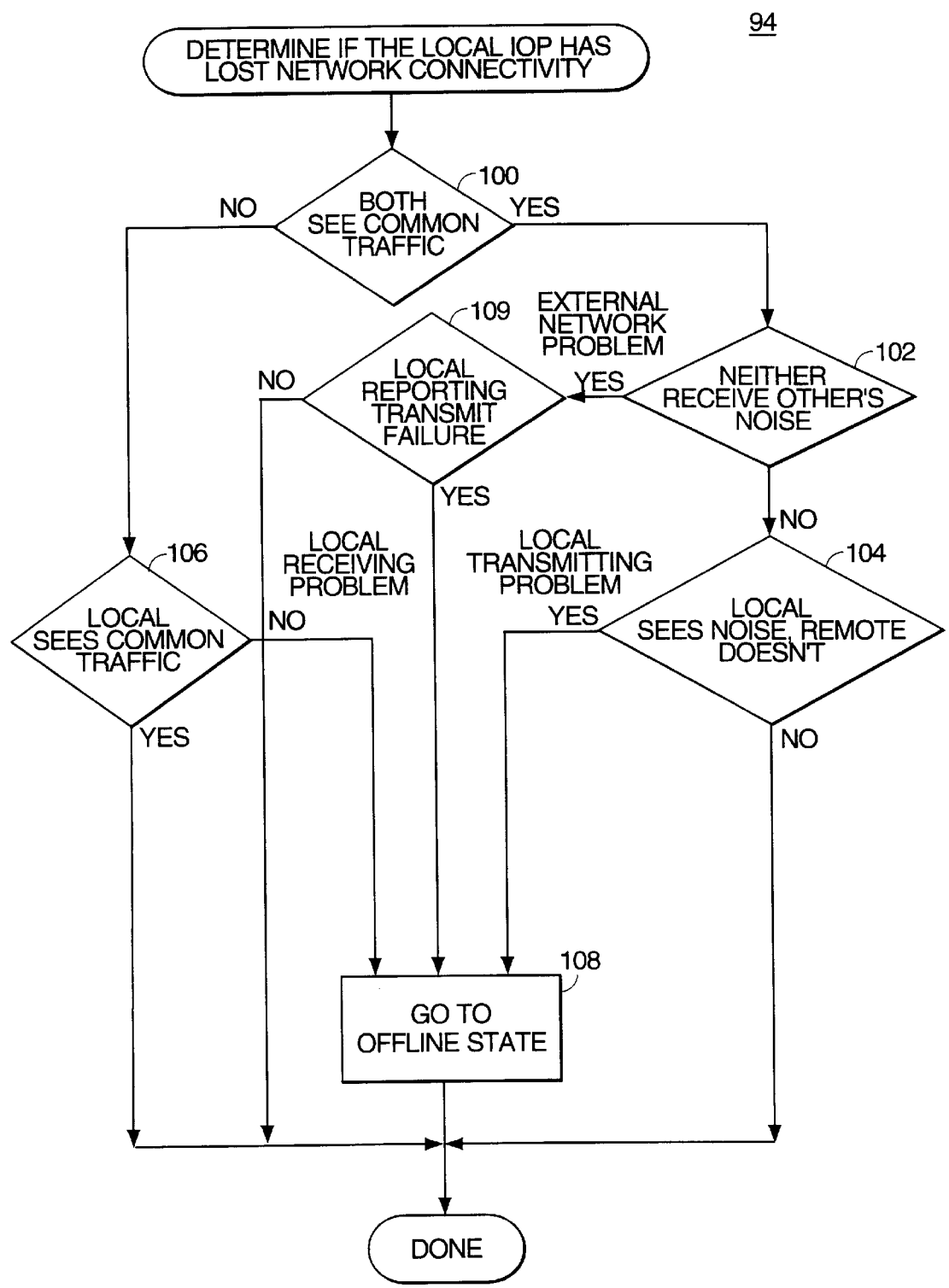

Referring to FIG. 5, the first step in procedure 94 is to determine whether both IOPs are receiving common traffic (step 100). The definition of common traffic depends on whether the local network provider determines that both IOPs are on a single segment or on different segments of LAN 40. Initially, both network providers assume that the IOPs are on different segments. In this case, common traffic corresponds to group addressed packets, other than noise packets, received by the IOPs. Both IOPs see common traffic if the value of TimeLastMulticastReceived in the network status response and the value computed at the local network provider are within a tolerance referred to as ReceiveTolerance. The default value of ReceiveTolerance is 1000 milliseconds. If the network providers have determined that they are on the same segment, common traffic also includes packets directed to the logical address of system 10. Therefore, in addition to comparing TimeLastMulticastReceived, TimeLastPacketReceived is compared and both IOPs see common traffic if the times are within ReceiveTolerance.

If both IOPs do not see common traffic, the procedure determines if the local IOP is receiving common traffic (step 106). The local network provider determines that the local IOP does not see common traffic if the value of TimeLastMulticastReceived or TimeLastPacketReceived for the local IOP is greater than the received value by at least ReceiveTolerance (i.e., if the last group addressed message was received locally at least ReceiveTolerance earlier than at the remote IOP). If the local IOP does not see common traffic then the network provider has determined that there is a fault in the receive path from LAN 40 to the IOP. The network provider therefore makes a transition to offline state 74 (or remains in that state) (step 108).

If both IOPs receive common traffic (step 100), the network provider determines whether neither of the IOPs is receiving the other's noise packets (step 102). This occurs when the value of each network provider's TimeLastNoiseReceived is greater than the local value of TimeLastNoiseTransmitted by at least ReceiveTolerance, and the local value of TimeLastNoiseReceived is greater than the received value of TimeLastNoiseTransmitted by at least ReceiveTolerance. If neither IOP is receiving the other's noise packets (step 102), the local provider checks whether it is reporting a transmit failure (step 109). If not, the network provider assumes that the fault must be within LAN 40 because concurrent failure on connections 62 and 64 would be needed to account for the status values. The simultaneous occurrence of both of these failure modes is assumed to be unlikely. If the network provide is reporting a transmit failure (step 109), then it goes to the offline state (step 108).

If at least one IOP is receiving the other's noise packets, the network provider determines whether locally transmitted noise packets are received by the other IOP (step 104). This occurs when the received value of TimeLastNoiseReceived does not exceed the local value of TimeLastNoiseTransmitted by at least ReceiveTolerance. If locally transmitted noise packets are received by the other IOP, then there is no fault with the local IOP. On the other hand, if the locally transmitted noise packets are not received by the other IOP, the network provider assumes that there is a fault in the transmit path from the local IOP to LAN 40, and the local network provider makes a transition to offline state 74 (step 108).

In all the tests, if a received time is greater than TimeNetworkMonitored, that time is considered invalid. This mechanism is used to prevent using inaccurate statistics. A further restriction on state changes is that a network provider in the offline state 74 must receive at least one packet while in that state before making a transition to online state 70. This restriction inhibits the state transition when there is absolutely no network traffic visible to either IOP.

Other embodiments are within the scope of the following claims. For example, the system described above uses dual redundant IOPs. Three or more IOPs can be used with a similar method of comparing the relative times of various categories of communications. When three or more IOPs are used, the responses from multiple IOPs can be used together to detect communication failures. In addition, relative times of other categories of system events than those described above could be used for fault detection. Furthermore, the approach of using relative timing of communication events can be used to detect internal communication failures within the fault-tolerant system itself. Finally, the IOPs could be attached to different LANs if suitable forwarding of their noise packets were enabled.

What is claimed is:

1. A method for detecting a failure in a fault-tolerant computer system that includes a first input/output processor and a second input/output processor coupled to a data communication system, the method comprising the steps of:

processing a first data communication at the first input/output processor;

applying a timing criterion to a category of the first data communication processed by the first input/output processor to produce a first timing result;

processing a second data communication at the second input/output processor;

applying the timing criterion to the category of the second data communication processed by the second input/output processor to produce a second timing result;

determining a relationship between the first timing result and the second timing result; and detecting whether a failure has occurred based on the determined relationship.

2. The method of claim 1 wherein the step of detecting whether the failure has occurred includes determining that a failure has occurred when a difference between the timing results exceeds a threshold value.

3. The method of claim 1 wherein the timing criterion is a time of last transmission or reception.

4. The method of claim 1 wherein the category of data communications includes messages originating from the first input/output processor.

5. The method of claim 4 wherein the category of data communications includes messages originating from the first input/output processor and directed to an address to which the second input/output processor is normally responsive.

6. The method of claim 4 wherein the category of data communications includes messages sent from the first input/output processor and directed through the data communication system to the second input/output processor.

7. The method of claim 1 wherein the category of data communications includes messages originating outside the computer system.

8. The method of claim 7 wherein the messages originate at a second computer coupled to the data communication system.

9. The method of claim 7 wherein the category of data communications includes messages originating outside the computer system and addressed to a group of systems of which the computer system is a member.

10. The method of claim 1 wherein the category of data communications includes messages originating from a third element of the computer system in data communication with the input/output processors.

11. The method of claim 1 further comprising the step of sending the first timing result from the first input/output processor to the second input/output processor wherein:

the step of applying the timing criterion to the category of the first data communication processed by the first input/output processor includes applying the timing criterion to the category of the first data communication processed by the first input/output processor at the first input/output processor;

the step of applying the timing criterion to the category of the second data communication processed by the second input/output processor includes applying the timing criterion to the category of the second data communication processed by the second input/output processor at the second input/output processor; and the step of determining a relationship between the timing results includes determining a difference between the timing results at the second input/output processor.

12. The method of claim 11 wherein the first timing result is sent over a dedicated communication channel between the first input/output processor and the second input/output processor.

13. The method of claim 1 wherein the step of applying the timing criterion to the category of the first data communication processed by the first input/output processor further includes applying a plurality of timing criteria to a corresponding plurality of categories of the first data communication processed by the first input/output processor to produce a first plurality of timing results;

the step of applying the timing criterion to the category of the second data communication processed by the second input/output processor further includes applying the plurality of timing criteria to the corresponding plurality of categories of the second data communication processed by the second input/output processor to produce a second plurality of timing results; and the step of determining a relationship between the timing results further includes determining relationships between corresponding ones of the first plurality of timing results and the second plurality of timing results.

14. A fault-tolerant computer system coupled to a data communication system comprising:

a first input/output processor configured to process a category of data communications and to apply a timing criterion to the category of data communications to produce a first timing result; and a second input/output processor configured to process the category of data communications and to apply a timing criterion to the category of data communications to produce a second timing result;

wherein the computer system is configured to determine a relationship between the timing results and to determine whether a failure has occurred based on the relationship.

15. The system of claim 14 wherein the timing criterion is a time of last transmission or reception.

16. The system of claim 14 wherein the category of data communications includes messages originating from the first input/output processor.

17. The system of claim 16 wherein the category of data communications includes messages sent from the first input/output processor and directed through the data communication system to the second input/output processor.

18. The system of claim 16 wherein the category of data communications includes messages originating from the first input/output processor and directed to an address to which the second input/output processor is normally responsive.

19. The system of claim 14 wherein the category of data communications includes messages originating outside the fault-tolerant system.

20. The system of claim 19 wherein the messages originate at a second computer coupled to the data communication system.

21. The system of claim 19 wherein the category of data communications includes messages originating outside the fault-tolerant system and addressed to a group of systems of which the fault-tolerant system is a member.

22. The system of claim 14 further comprising a third element of the computer system in data communication with the input/output processors, and wherein the category of data communications includes messages originating from said third element.

23. The system of claim 14 further comprising:

a dedicated communication channel coupling the first input/output processor and the second input/output processor, the communication channel being configured to send the first timing result from the first input/output processor to the second input/output processor;

wherein the second input/output processor is configured to determine a difference between the timing results and to detect whether the failure has occurred when the difference exceeds a threshold.

24. The system of claim 14 wherein:

the first input/output processor is further configured to apply a plurality of timing criteria to a corresponding plurality of categories of data communications processed by the first input/output processor to produce a first plurality of timing results;

the second input/output processor is further configured to apply the plurality of timing criteria to the corresponding plurality of categories of data communications processed by the second input/output processor to produce a second plurality of timing results; and the computer system is further configured to determine a relationships between corresponding ones of the first and second plurality of timing results and to determine whether the failure has occurred based on the determined relationships.

* * * * *